Figure 1:
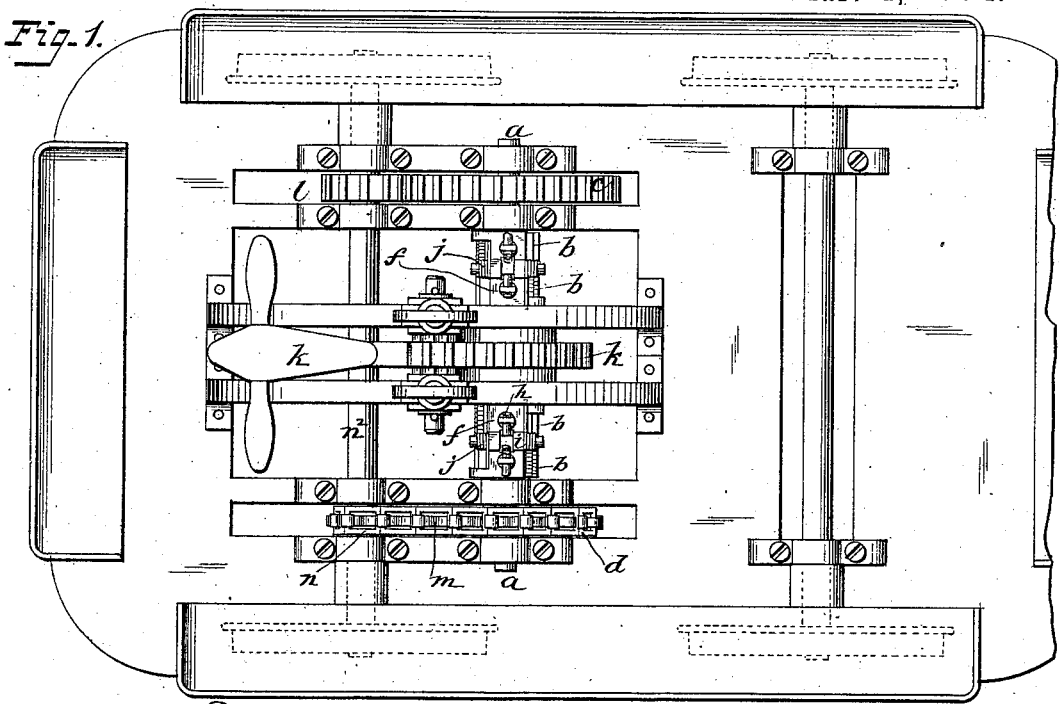

(No Model.) 2 Sheets—Sheet 1.

J. H. SCHAFFER.
MECHANICAL POWER.

No. 294,681. Patented Mar. 4, 1884.

Attest:
Cont. A. Cooper
Lutie Norris

Inventor:
John H. Schaffer
by Johnson and Johnson
His Attorneys (No Model.) 2 Sheets—Sheet 2.
J. H. SCHAFFER.
MECHANICAL POWER.
No. 294,681. Patented Mar. 4, 1884.
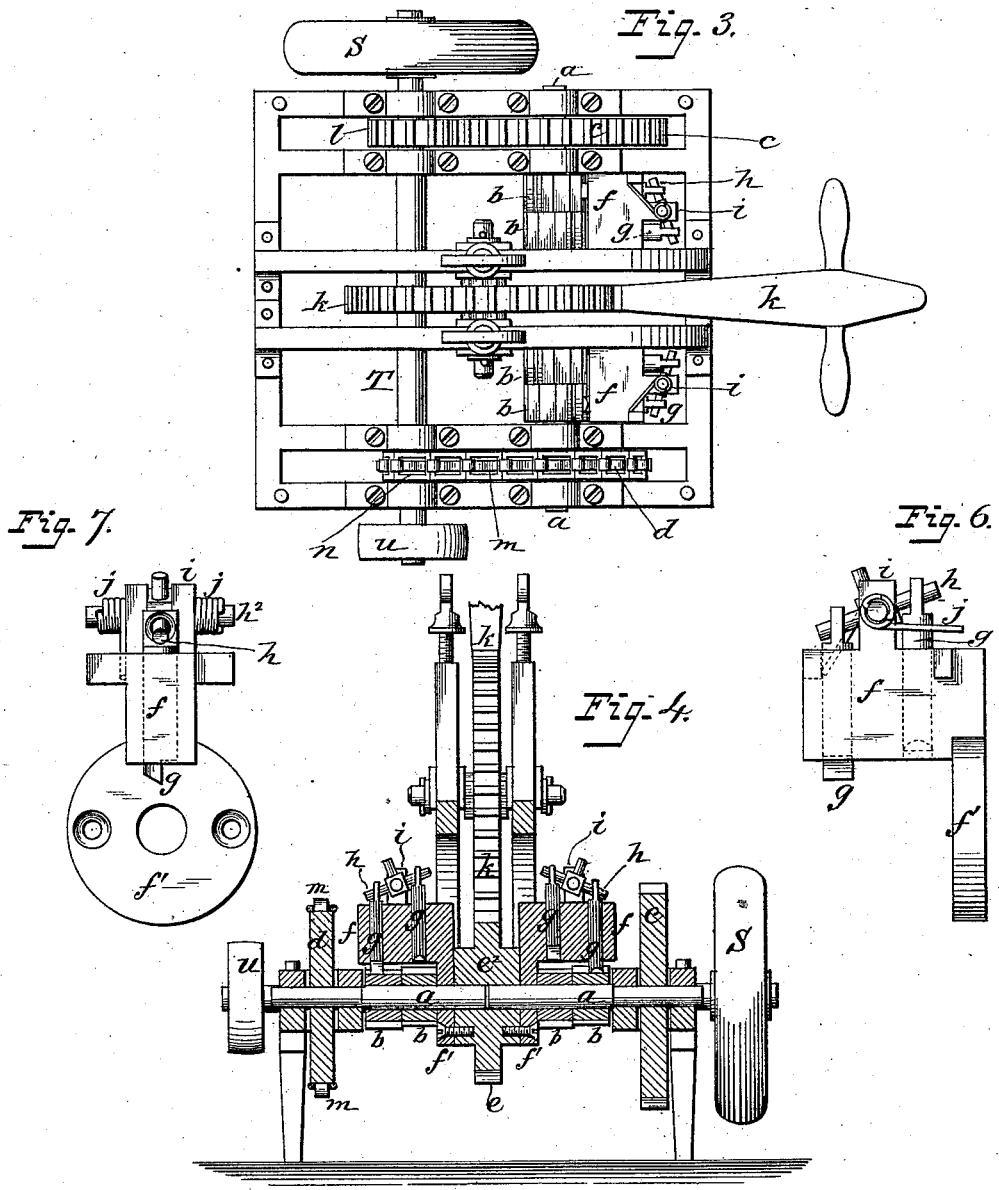

UNITED STATES PATENT OFFICE.

JOHN H. SCHAFFER, OF BLUE RIVER, HANCOCK COUNTY, INDIANA.

MECHANICAL POWER.

SPECIFICATION forming part of Letters Patent No. 294,681, dated March 4, 1884.

Application filed January 10, 1884. (No model.)

*To all whom it may concern:*

Be it known that I, JOHN H. SCHAFFER, a citizen of the United States, residing at Blue River township, in the county of Hancock and State of Indiana, have invented new and useful Improvements in Mechanical Powers, of which the following is a specification.

My invention relates to mechanical powers applicable as a lever-motor for propelling hand-cars and for operating light machinery in which a rotary or reciprocating movement is required.

My improved motor is constructed with special reference to obtaining a lever-power adapted for running a hand car or cart forward or backward, and for this purpose I provide a simple and convenient means for quickly and easily reversing the motion independent of the operating-lever connections. A lever-gear is combined with a gear having an arm projecting from its opposite sides, each arm carrying two independent spring-ratchets adapted for operation with ratchet-wheels fixed upon two independent drive-shafts, upon the contiguous ends of which the said armed gear is loosely supported, so that the turning of the lever-gear backward and forward upon its center turns the loosely-mounted armed gear, which, by means of the spring-ratchets, revolves the independent drive-shafts in opposite directions, which are connected by suitable gearing with the axle of the car or with a power-transmitting shaft, in such manner as to give the latter a continuous revolution in one direction. The changing of the direction of motion of the independent drive-shafts by the adjustment of the spring-ratchets changes the direction of the motion of the car-axle or power-transmitting shaft, and thereby propels the car in the required direction, all of which will be hereinafter fully described preparatory to a specific designation of the organization of devices and combinations of parts claimed as my invention.

The object of the combination of the separate and independent drive-shafts and their ratchet-wheels with the separate and independent ratchets and the lever is to utilize the backward and forward movements of the lever to give a continuous and steady rotation to the driving-wheels or to the power-transmitting shaft in one direction only, as contradistinguished to a lever having ratchets adapted to operate with its forward or with its backward movement, to drive the car forward or backward, but not to operate the ratchets with both movements of the lever to drive the car in one direction only—that is to say, the object of my invention is to apply the power of the lever in every part of its movement without regard to the direction the car is moving, and thereby obtain a continuous exertion of the power, and hence greater and more uniform speed than is possible with such power intermittently exerted.

Figure 8:
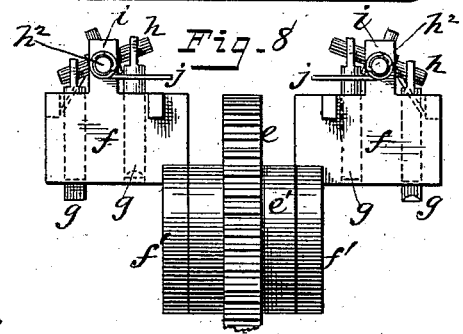
Figure 2:
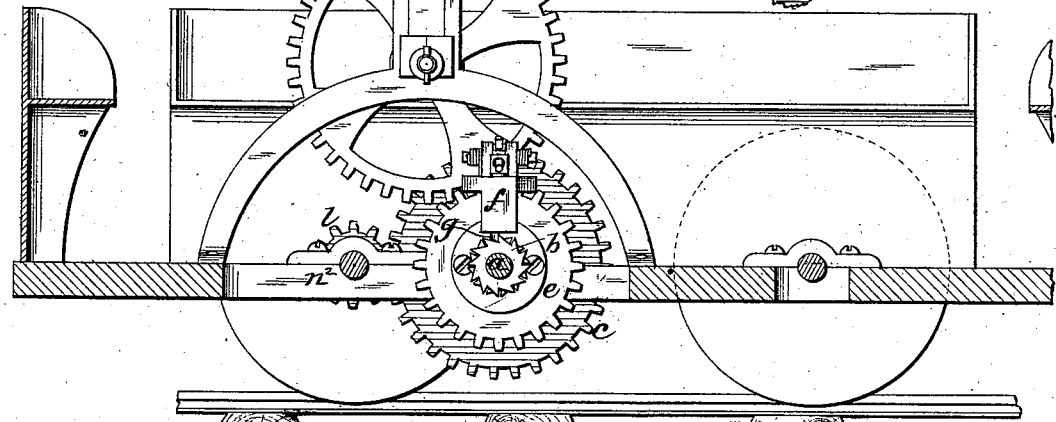

Referring to the accompanying drawings, Figure 1 represents a top view of my improved lever-power as applied by suitable gearing-connections to a railway hand-car; Fig. 2, a vertical section of the same; Fig. 3, a view showing the power adapted for operating light machines by belt; Fig. 4, a vertical section showing the independent drive-shafts and the independent spring-ratchet connections therewith and with the hand-lever gear; and Figs. 5, 6, and 7 represent one of the arms of the gear and its spring-ratchets in different positions detached from the independent drive-shaft, Fig. 5 being the top, Fig. 6 the side, and Fig. 7 the end view; and Fig. 8 represents the armed gear.

The mechanism which comprises the motor proper consists, essentially, of two separate and independent short shafts, $a\ a$, arranged in line, their ends nearly abutting, each having two ratchet-wheels, $b\ b$, fixed thereon side by side, with their teeth inclining in opposite directions—that is, the teeth of the two ratchet-wheels of each shaft incline in opposite directions. These shafts are supported in suitable bearings, and one has a spur-gear, $c$, on its outer end, while the other has a sprocket-wheel, $d$, on its outer end. A gear, $e$, is loosely mounted upon the inner or abutting ends of these shafts between the ratchet-wheels, and has an arm, $f$, extending horizontally from each side of sufficient length to stand over the ratchet-wheels of each shaft. Each arm carries two spring-ratchets, $g\ g$, adapted for independent operation with the ratchet-wheels of the independent shafts. I prefer to form the arms $f$ each upon a separate ring, $f'$, and secure the latter by screws upon the face of a hub, $e^2$, of said loose gear $c$, so that the ratchet-wheels $b$ join the face of said rings. The ratchets $g\ g$ are pins, having their acting ends beveled to take into and move over the beveled teeth of the ratchet-wheels, and they are fitted loosely into openings in the gear-arms, so that in every position of the latter the ratchets stand radial to the drive-shafts, there being one ratchet adapted to operate in each ratchet-wheel. The ratchet-carrying arms are preferably in line with each other, and the ratchet-pins $g$ are preferably connected to each other at their outer ends by a pin, $h$, pivoted to a projection, $i$, of the gear-arm $f$, between the outer ends of said ratchet-pins. A separate spring, $j$, is connected to each ratchet-pin in any suitable manner, so that only the spring of one ratchet-pin will act at a time to hold one of the ratchet-pins in to work, said spring being so connected to the gear-arm as to allow of its being engaged with and disengaged therefrom, so that either of the ratchet-pins may be thus engaged with the ratchet-wheels to run forward and backward, as may be desired. As the ratchet-pins are connected together by the pivoted pin $h$, the action of one spring to hold one of the ratchet-pins in to its work will thereby hold the other ratchet-pin out of work, so that one ratchet-pin of each arm $f$ will constantly act upon one of the ratchet-wheels $g$ of each shaft $a$, and the latter are thereby made separate drive-shafts.

A lever-gear, $k$, is mounted in suitable bearings above the drive-shafts, and engages with the armed gear $e$, by which the latter is rotated back and forth. The lever may be worked in a vertical position, or it can be worked up and down, like a pump-handle, from either side, the operator either standing or sitting; and for this purpose the lever-gear is supported in a frame that will allow the lever to be turned through a half-circle, more or less. The motor is located in the car over or nearly over one of the axles, so that the gear $c$ of one of the drive-shafts will mesh with a pinion, $l$, on the axle to drive it, and the chain $m$ from the sprocket-wheel $d$ of the other drive-shaft will operate a sprocket-pinion, $n$, on the axle $n^2$, to drive it in the same direction, so that both drive-shafts co-operate to produce a continuous driving of the axle.

When the motor is used for driving light machinery, I use a power-transmitting shaft, T, having a balance-wheel, S, on one end, and a pulley, $u$, on the other, from which a band leads to the machine to be driven, as shown in Figs. 3 and 4. I may also convert the rotary motion into a reciprocating motion by a pitman-rod connection with a crank on the balance-wheel.

When the motor is constructed to operate a machine only in one direction, a single ratchet-wheel and a single co-operating ratchet-pin for each drive-shaft will only be required.

When the motor is used for propelling a hand-car, the mechanism is placed beneath the car, so that the hand-lever will extend up through the floor.

I claim—

1. The combination, in a lever-power, of a lever-gear with the separate and independent shafts $a\ a$, each having one or more fixed ratchet-wheels, $b$, and a gear on their outer ends, and a gear mounted loosely upon their contiguous ends, having side projecting arms, $f\ f$, and one or more spring-ratchets, $g\ g$, carried by said gear-arms in co-operating relation to the said ratchet-wheels, whereby the said shafts form separate and distinct drivers, substantially as described, for the purpose specified.

2. The combination, with the separate and distinct drive-shafts $a\ a$, each having two fixed ratchet-wheels, $b\ b$, with their teeth inclining in opposite directions, and a gear, $c\ d$, on their outer ends, of a gear, $e$, loosely mounted upon the contiguous ends of said shafts, having side projecting arms, $f\ f$, two connected ratchet-pins, $g\ g$, carried by said arms in co-operating relation to the said ratchet-wheels, a suitable adjustable spring-connection for each ratchet-pin, and a lever-gear operating with the said loose armed gear, substantially as described, for the purpose specified.

3. In combination, the following devices constituting a lever-power, viz: two separate and independent shafts, $a\ a$, each having two fixed ratchet-wheels, $b\ b$, their teeth inclining in opposite directions, a spur-gear, $c$, on the outer end of one shaft, and a sprocket-wheel, $d$, on the outer end of the other shaft, the gear $e$, loosely mounted upon the contiguous ends of said separate shafts, having side arms, $f\ f$, the spring-operated ratchet-pins $g\ g$, carried by said gear-arms, the hand-operating lever-gear, the power-transmitting shaft, the spur-pinion, the sprocket-wheel, and the chain, all constructed and arranged for operation substantially as herein set forth.

In testimony whereof I have hereunto set my hand in the presence of two subscribing witnesses.

JOHN H. SCHAFFER.

Witnesses:
  GEORGE R. STANLEY,
  FRANCIS M. BRUFORD.